S. F. JOHNSON.
DEVICE FOR BREAKING CIRCUIT BETWEEN GENERATOR OR MAGNETO AND STORAGE BATTERY.
APPLICATION FILED FEB. 25, 1915.

1,179,929.

Patented Apr. 18, 1916.
2 SHEETS—SHEET 1.

WITNESSES:

INVENTOR
Solomon F. Johnson
BY
ATTORNEY

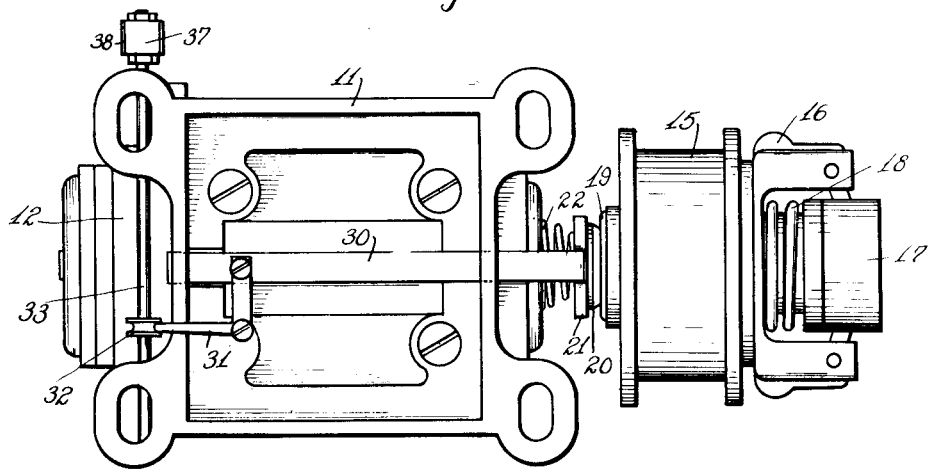

UNITED STATES PATENT OFFICE.

SOLOMON F. JOHNSON, OF INDIANAPOLIS, INDIANA.

DEVICE FOR BREAKING CIRCUIT BETWEEN GENERATOR OR MAGNETO AND STORAGE BATTERY.

1,179,929.  Specification of Letters Patent.  Patented Apr. 18, 1916.

Application filed February 25, 1915. Serial No. 10,516.

*To all whom it may concern:*

Be it known that I, SOLOMON F. JOHNSON, a citizen of the United States, and a resident of Indianapolis, county of Marion and State of Indiana, have invented a certain new and useful Device for Breaking Circuit Between Generator or Magneto and Storage Battery; and I do hereby declare that the following is a full, clear, and exact description thereof, reference being had to the accompanying drawings, in which like letters refer to like parts.

The object of this invention is to do away with the usual type relay or reverse current cut-out in connection with generators and magnetos, for charging storage batteries. In using the usual type of magnetos and generators, it is necessary to break the circuit between generator and storage battery when the armature is not revolving at a sufficient speed to generate electricity, so as to prevent the backflow of electricity from the storage battery through the generator. The relay has caused a great deal of trouble in that the contact points become coated, so that they stick together, thus keeping the circuit closed and allowing a backflow of electricity from the storage battery, or they become clogged with dirt and dust so as to not make a perfect contact, whereby the electricity generated does not reach the battery. This device does away with the troubles arising from the relay, which are numerous and of various kinds, and is of a more simple operation and cheaper to make.

The feature of this invention is the means within the generator for breaking the circuit from generator to the storage battery when the armature is not revolving at sufficient speed to generate the current and where the speed becomes great enough to generate sufficient current to charge the batteries the circuit is automatically closed. This is accomplished by a brush being automatically lifted off of the commutator by the generator when the speed is reduced.

Figure 1:
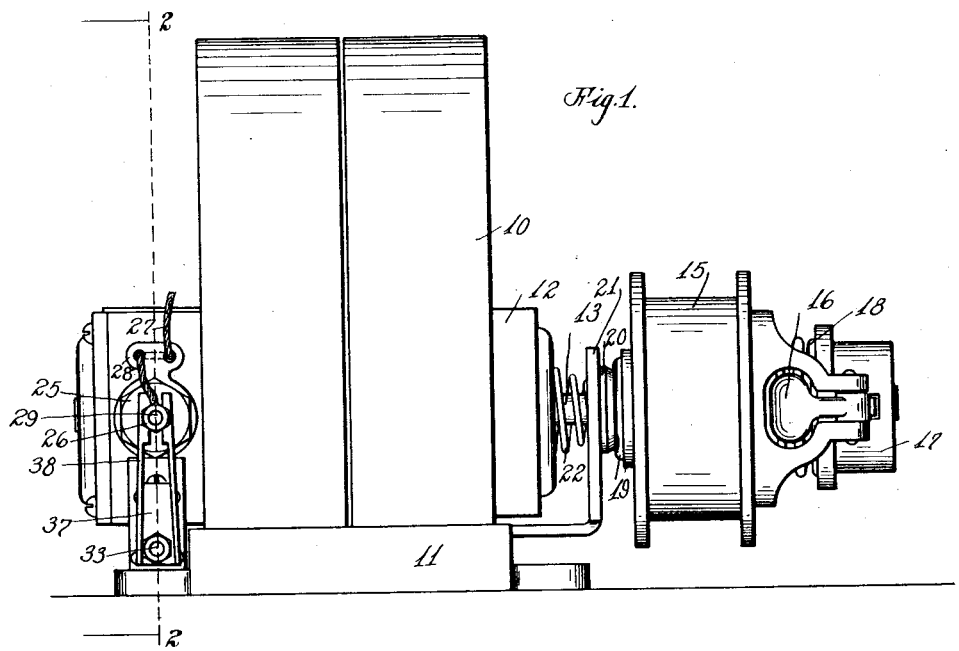
Figure 2:
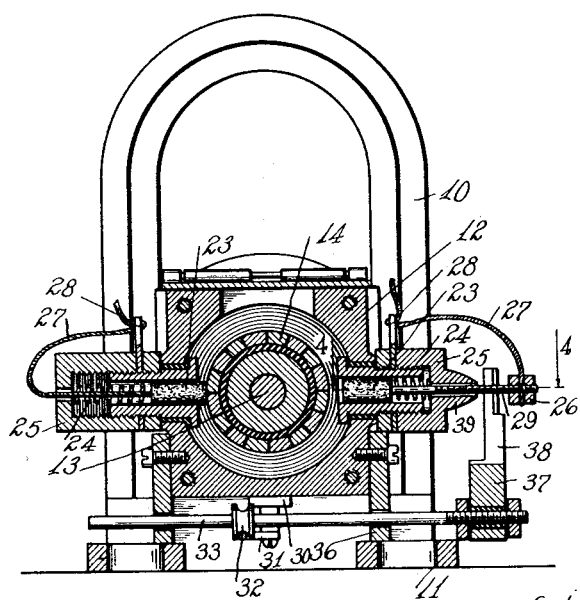

The full nature of the invention will be understood from the accompanying drawings and the following descriptions and claims:

Figure 1 is a side elevation of the generator. Fig. 2 is a cross section on line 2—2 of Fig. 1. Fig. 3 is a plan view of the bottom of the generator. Fig. 4 is a cross section on line 4—4 of Fig. 2.

In the drawings there are permanent magnets 10 of the ordinary type used on magnetos, set on a base 11. There is an armature housing 12, extending through the magnets. A commutator shaft 13 extends through said armature housing and has rigidly secured thereto on one end a commutator 14 and on the other end thereof a cap 17. A pulley 15 and a ball governor 16, are keyed to said shaft, adapted to turn with said shaft but free to move horizontally thereon. Between the pulley and the cap there is a spring 18 against which the centrifugal force of said governor is exerted. There is a thrust bearing 19, on said shaft 13, which rides on the race 20 secured to a plate 21. Between said plate 21 and the armature housing there is a spring 22 which normally holds said plate in outward position. On each side of the commutator there are commutator brushes 23 held against the commutator by springs 24 in the housing 25. One of said brushes has a pin 29 extending outwardly through said housing, which is threaded and has a nut 26 secured thereto at the outer end. A pig tail 27 is secured to said pin and connected to the plate 28 held by the housing 25 against the armature housing. There is a bar 30 connected to the bottom of the plate 21 and extending at right angles therefrom across the bottom of the generator as shown in Fig. 3. Pivoted thereto is a bell crank 31 having one end engaging the member 32, which is rigidly secured to rod 33. Said shaft extends through brackets 36 and is bolted to an arm 37 so that the movement of the plate 21 will operate the arm 27. The arm 37 engages and holds a pin 29 by means of the two spring blades 38 engaging the screw threads thereon, as shown in Fig. 4. The housing 25 through which said pin extends has an outwardly tapering portion 39 which engages the spring blades 38 and disengages them from the screw threads when the rod 33 is moved to the left thus releasing the pin 29 and allowing the brush to be forced against the commutator by the spring 24.

The operation is as follows: When the generator is not in operation the plate 21 is forced outwardly by means of the springs 18 and 22. Thus by means of the bar 30 the bell crank 31 and rod 33, the spring blades 38 are held in their outward position, thereby gripping the pin 29 and lifting the brush from the commutator. While in this position the circuit is broken and no electricity can escape from the storage battery through the generator. When the generator is operated at such a speed as to overcome the current from the battery and generates enough electricity to charge it, the ball governors are thrown outward by centrifugal force and forces the plate 21 inwardly against the spring 22, which by means of the bar 30 and bell crank 31 pulls the arm 37 to the left so that it is engaged by the tapering portion 39 of the housing 25 which forces apart the spring blades 38, thus disengaging the pin 29 and allowing the spring 24 to force the commutator brush against the commutator, which closes the circuit with the battery and allows it to be charged. In this way the generator itself automatically opens and closes the circuit without the aid of the relay. This invention is not limited to any specific means of operating the commutator brush as it may readily be seen that there are many ways of accomplishing this, but the main feature of the invention lies in the means for breaking the circuit by the removal of a commutator brush from engagement with the commutator. It is also obvious that if desired, both brushes may be lifted from the commutator by similar means to accomplish the same result.

The invention claimed is:

1. Means for generating electricity including an armature, a commutator shaft passing through said armature, a ball governor on one end of said shaft, a commutator on the other end of said shaft, commutator brushes adapted to engage said commutator, a pin on one of said brushes, and means connected with said ball governor for engaging the said pin and lifting said brush off of said commutator.

2. Means for generating electricity including an armature, a commutator shaft passing through said armature, a ball governor on one end of said shaft and commutator on the other end of said shaft, commutator brushes adapted to engage said commutator, a pin on one of said brushes, spring blades for engaging said pin, and means connected with said governor for actuating said spring blades.

3. Means for generating electricity including an armature, a commutator, a governor, commutator brushes adapted to engage said commutator, a projection on one of said brushes, an arm adapted to engage said projection, and means for disengaging said arm from said projection.

4. Means for generating electricity including an armature, a commutator shaft passing through said armature, a ball governor on one end of said shaft and commutator on the other end of said shaft, commutator brushes adapted to engage said commutator, a pin on one of said brushes, spring blades adapted to engage said pin, and a housing around said brush adapted to disengage said spring blades from said pin.

5. Means for generating electricity including an armature, a commutator shaft passing through said armature, a ball governor on one end of said shaft, a commutator on the other end of said shaft, commutator brushes adapted to engage said commutator, housings on said brushes, springs in said housings for engaging said brushes with said commutator, and means for engaging and disengaging one of said brushes from said commutator.

6. Means for generating electricity including an armature, commutator shaft passing through said armature, governor on one end of said shaft, a commutator on the other end of said shaft, commutator brushes adapted to engage said commutator, a pin on one of said brushes, knife edges adapted to engage said pin, a rod rigidly secured to said spring blades, and a bell crank actuated by said governor for operating said rod.

7. Means for generating electricity including an armature, commutator shaft passing through said armature, a governor on one end of said commutator shaft, a commutator on the other end thereof, brushes adapted to engage said commutator, a pin on one of said brushes, spring blades adapted to engage said pin, means connected with said governor for engaging said spring blades and lifting said brush from said commutator, and means for disengaging said spring blades from said pin, and a spring for returning said brush to engagement with said commutator.

8. Means for generating electricity including an armature, a commutator shaft passing through said armature, a governor on one end of said shaft, a commutator on the other end thereof, commutator brushes adapted to engage said commutator, a pin secured to one of said brushes, means connected with said governor for engaging said pin and lifting said brush from engagement with said commutator when said generating means is revolving at slow speed, and means for disengaging said pin and returning said brush to engagement with said commutator when said generating means attains high speed.

In witness whereof, I have hereunto affixed my signature in the presence of the witnesses herein named.

SOLOMON F. JOHNSON.

Witnesses:
J. H. WELLS,
R. G. LOCKWOOD.